United States Patent
Corbin et al.

(10) Patent No.: US 6,740,143 B2
(45) Date of Patent: May 25, 2004

(54) MIXED MATRIX NANOPOROUS CARBON MEMBRANES

(75) Inventors: David Richard Corbin, West Chester, PA (US); Henry Charles Foley, Hockessin, PA (US); Mark Brandon Shiflett, New Castle, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/275,190

(22) PCT Filed: Jun. 19, 2001

(86) PCT No.: PCT/US01/19592

§ 371 (c)(1),
(2), (4) Date: Nov. 1, 2002

(87) PCT Pub. No.: WO01/97956

PCT Pub. Date: Dec. 27, 2001

(65) Prior Publication Data

US 2004/0050249 A1 Mar. 18, 2004

Related U.S. Application Data

(60) Provisional application No. 60/213,129, filed on Jun. 22, 2000.

(51) Int. Cl.[7] .......................... B01D 53/22; B01D 69/12; B01D 71/06

(52) U.S. Cl. .......................... 96/11; 55/524; 55/DIG. 5

(58) Field of Search ..................... 96/4, 11–14; 55/524, 55/DIG. 5

(56) References Cited

U.S. PATENT DOCUMENTS

| | | | |
|---|---|---|---|
| 3,859,421 A | | 1/1975 | Hucke |
| 4,261,832 A | * | 4/1981 | Schumacher et al. .. 210/500.27 |
| 5,104,425 A | * | 4/1992 | Rao et al. ....................... 95/47 |
| 5,354,547 A | * | 10/1994 | Rao et al. ................... 423/650 |
| 5,431,864 A | * | 7/1995 | Rao et al. ................... 264/29.5 |
| 5,447,559 A | * | 9/1995 | Rao et al. ......................... 96/4 |
| 5,507,856 A | * | 4/1996 | Rao et al. ....................... 95/50 |
| 5,507,860 A | | 4/1996 | Rao et al. |
| 5,912,048 A | | 6/1999 | Rao et al. |
| 5,972,079 A | * | 10/1999 | Foley et al. .................... 96/11 |
| 6,004,374 A | * | 12/1999 | Rao et al. ....................... 95/52 |
| 6,117,328 A | * | 9/2000 | Sikdar et al. ................ 210/640 |
| 6,471,745 B1 | * | 10/2002 | Foley et al. .................... 95/54 |
| 6,503,295 B1 | * | 1/2003 | Koros et al. .................... 95/51 |
| 6,527,827 B2 | * | 3/2003 | Noack ............................ 95/45 |
| 6,562,110 B2 | * | 5/2003 | Koros et al. ...................... 96/4 |

FOREIGN PATENT DOCUMENTS

EP 0428052 A2 5/1991

* cited by examiner

*Primary Examiner*—Robert H. Spitzer

(57) ABSTRACT

The invention concerns nanoporous carbon membranes which have been synthesized by pyrolysis of selected polymers on porous substrates to produce thin mixed matrix carbon film with pores for separation of small molecules.

5 Claims, 2 Drawing Sheets

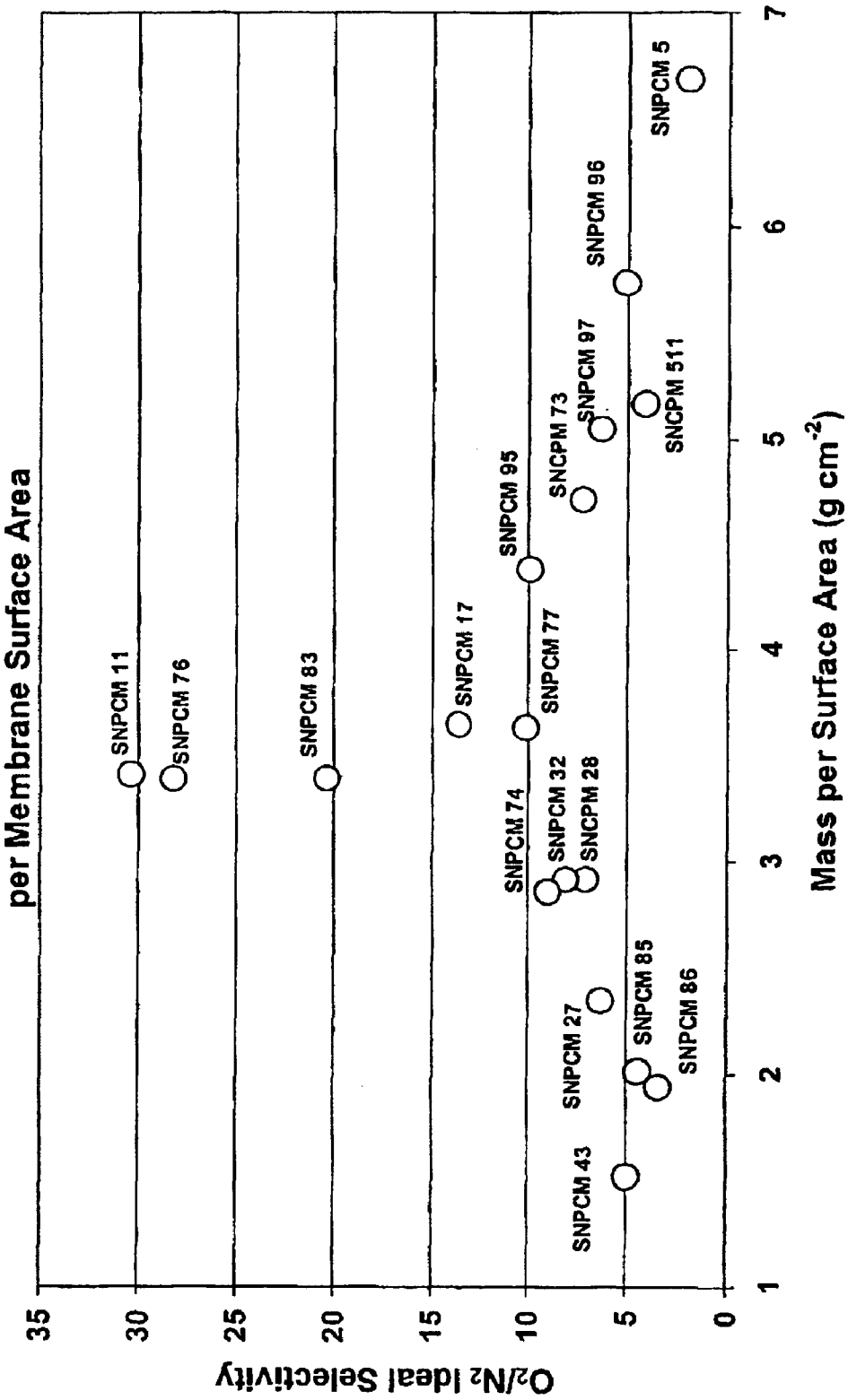

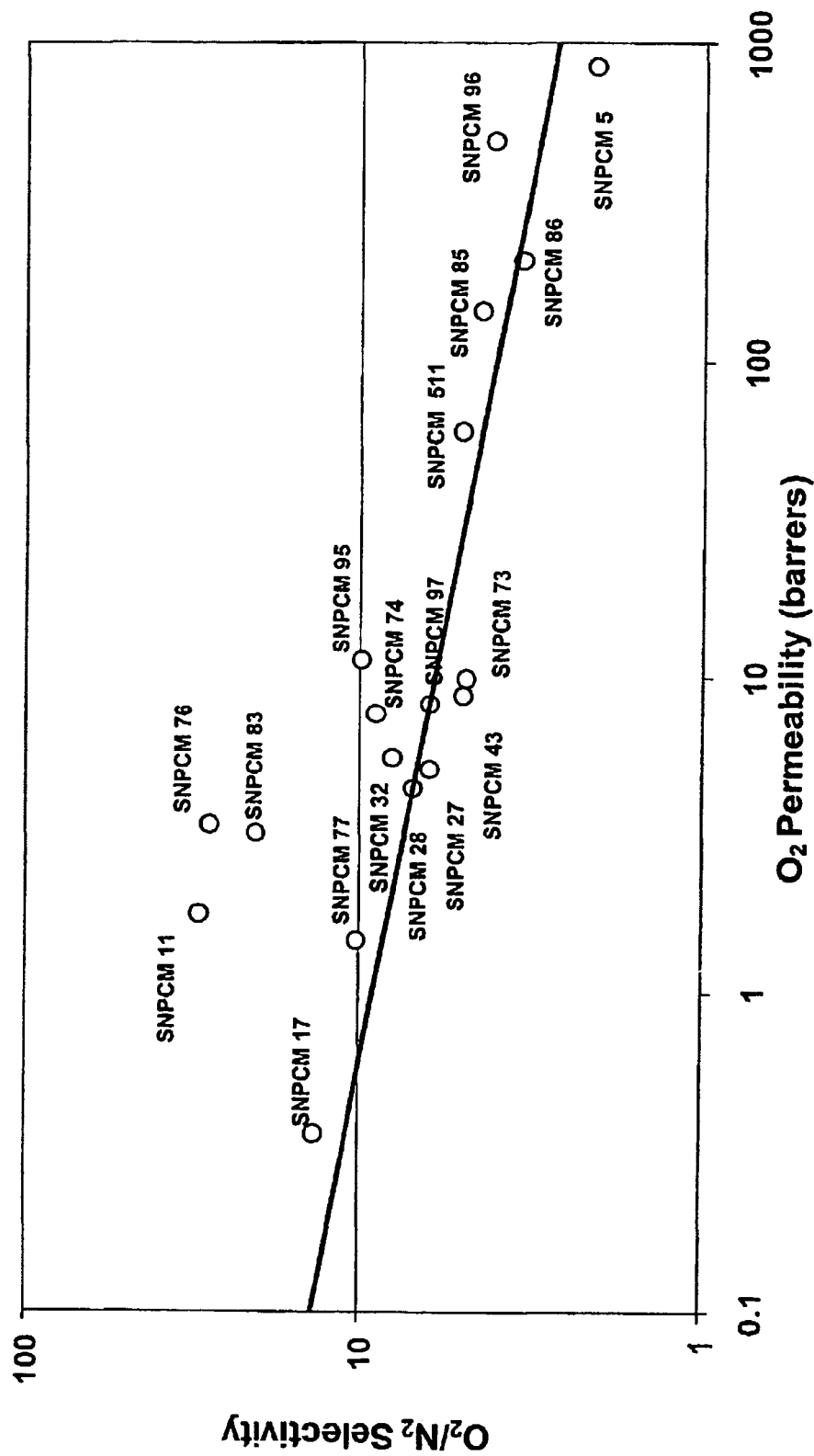

MIXED MATRIX NANOPOROUS CARBON MEMBRANES

This application claims the benefit of Provisional application Ser. No. 60/213,129, filed Jun. 22, 2000.

FIELD OF THE INVENTION

This invention concerns supported nanoporous carbon membranes with additives such as, but not limited to, titanium dioxide, small pore high silica zeolites, and poly (ethylene glycol). Such supported membranes are synthesized by pyrolysis of one or more layers of polymer containing materials, wherein at least one of the pyrolyzed layers is a polymer and additive mixture, on a porous substrate so as to produce a thin mixed matrix film with pores for the separation of small molecules.

TECHNICAL BACKGROUND OF THE INVENTION

Ceramic membranes can be used at high temperatures and in harsh environments as described in K. Keizer, H. Verweij, Progress in Inorganic Membranes, Chemtec, 16-1 (1996) 37. This kind of membrane is useful for catalysis as well as for separations.

Nanoporous carbons (NPC) or carbon molecular sieves (CMS) are good candidate materials for selective membrane formation. These can be prepared by the controlled pyrolysis of polymers such as poly(vinyl chloride) (PVC), poly (acrylonitrile) (PAN) and poly(furfuryl) alcohol (PFA), to name a few (See for example, H. C. Foley, Carbogenic Molecular Sieves, Microporous Mats., 4 (1995), 407, H. C. Foley, M. S. Kane, J. F. Goellner, in T. J. Pinnavaia and M. F. Thorpe, Access in Nanoporous Material, Plenum, New York, N.Y., 1995). Although amorphous, they are endowed with a regular nanostructure that leads to a pore network with narrowly distributed pore dimensions between 0.3 and 0.6 nm (R. K. Mariwala, H. C. Foley, Evaluation of Ultramicroporous Adsorptive Structure in poly(furfuryl alcohol) derived carbogenic molecular sieves, Ind. Eng. Chem. Res., 33 (1994) 607, M. S. Kane, J. F. Goellner, H. C. Foley, R. DiFrancesco, S. J. Billinge, L. F. Allard,: Symmetry breaking in nanostructure development of carbogenic molecular sieves: effect of morphological pattern formation on oxygen and nitrogen transport, Chem. of Mat., 8 (1996) 2159, V. Petkov, R. G. DiFrancesco, S. J. L. Billinge, M. Acharya, H. C. Foley, Simulation of Nanoporous Carbons: A Chemically Constrained Structure, Philos, Mag., B., 79 (1999) 1519, M. Acharya, M. S. Strano, J. P. Mathews, S. J. Billinge, V. Petkov, S. Subramoney and H. C. Foley, Simulation of Nanoporous Carbons: A Chemically Constrained Structure, Philos. Mag., B, 79 (1999) 1499). These materials can be grown on porous stainless steel support media by brush-coating, by spray-coating as has been reported (M. Acharya, B. A. Raich, H. C. Foley, M. P. Harold, J. J. Leroous, Metal-Supported Carbogenic Molecular Sieve Membranes: Synthesis and Applications, Inc. Eng. Chem., 8 (1997) 1924, M. Acharya, H. C. Foley, Spray-coating of nanoporous carbon membranes for air separation, J. Memb. Sci., 161 (1999) 1) or, preferably, by ultrasonic deposition of the polymer resin (M. B. Shiflett, H. C. Foley, Ultrasonic Deposition of High Selectivity Nanoporous Carbon Membrans, Science, 285 (1999) 1902).

Applicants describe alternative methods for preparing carbon molecular sieve layers on a stainless steel support. A protocol for increasing flux was followed by including additives such as inorganic oxides like titanium dioxide ($TiO_2$), small pore high silica zeolite like SSZ-13, and polyethylene glycol (PEG) in the carbon film. Also, a protocol of pre-pyrolysis of the initial coatings in an inert environment at 800 K followed by heat treatment at lower temperatures 723 K and 650 K led to membranes with higher fluxes than previously reported. Initial coatings were also heat treated at lower temperature 423 K followed by heat treatment at 723 K after the final coatings were deposited as a means to more rapid membrane manufacturing. Furthermore, pyrolysis in the presence of a hydrogen atmosphere, also provides for high small molecule fluxes.

SUMMARY OF THE INVENTION

The present invention is a process for making thin film supported nanoporous carbon membranes with certain additive, such as titanium dioxide, small pore high silica zeolites, and poly(ethylene glycol).

Specifically, the invention includes a process for making a supported thin film nanopourous carbon membrane, having additive intermixed therein, comprising:

(a) coating a porous substrate with one or more layers of polymer intermixed with additive or a polymer alone, wherein at least one of the layers consists of polymer intermixed with additive, wherein the polymer or polymer intermixed with additive mixture is optionally dissolved in a solvent;

(b) drying the polymer coating by evaporating any solvent that may be present;

(c) then pyrolyzing the polymer or polymer mixture on the porous substrate so as to form a thin mixed matrix carbon film with pores for separation of small molecules; and, optionally, (d) repeating steps (a), (b) and (c) one or more times.

The invention further concerns a polymer membrane supported on a porous substrate produced by the above process.

Preferred polymers for use in the process are poly (furfuryl) alcohol, poly(vinyl chloride) and poly (acrylonitrile).

Preferred additives are titanium dioxide, small pore high silica zeolites, and/or poly(ethylene glycol).

The initial polymer or polymer with additive, to be coated on the substrate, are generally dissolved in a solvent. Solvents that can be useful are selected from the group consisting of acetone, methylethylketone, benzene and toluene Supports for the compositions described above include porous metals, porous ceramics, porous glasses and composites. Composites described herein are usefull as they can be fabricated into a number of shapes and of varying porosity for separation or catalysis uses.

BRIEF DESCRIPTION OF THE DRAWINGS

FIG. 1—$O_2/N_2$ ideal selectivity versus carbon mass per membrane area.

FIG. 2—$O_2/N_2$ ideal selectivity versus $O_2$ permeability.

DEFINITIONS

Nomenclature

A˙ membrane surface area, $m^2$

P˙ pressure, kPa

R˙ gas constant, $m^3 \cdot Pa \cdot gmol^{-1} \cdot K^{-1}$

T˙ temperature, K

V˙ volume, $m^3$ t˙ time, sec

Greek Symbols
  D˙ membrane thickness, m
  P˙ gas permeability, $mol.m^{-1}.Pa^{-1}.sec^{-1}$
  $P_0$˙ gas permeance, $mol.m^2.Pa^{-1}.sec^{-1}$
Subscripts
  cs˙ core side
  ss˙ shell side

DETAILED DESCRIPTION OF THE INVENTION

New preparation techniques for synthesis of thin film supported nanoporous carbon membranes using ultrasonic deposition have been developed. In contrast to other work these new techniques provide increasing flux while still achieving high small molecule selectivities.

Permeation experiments with pure gases such as nitrogen ($N_2$) and oxygen ($O_2$) were used to benchmark ideal separation performance with factors for $O_2/N_2$ ranging from 2 to 30 depending on synthesis conditions. Other gases such as hydrogen ($H_2$), helium (He), nitrous oxide ($N_2O$), carbon dioxide ($CO_2$) and methane ($CH_4$) also revealed good molecular sieving behavior based upon ideal separation factors for $H_2/CH_4$ of 600, $CO_2/CH_4$ of 45, $N_2O/N_2$ of 17, and $H_2/CO_2$ of 14, each of which wore derived from single gas permeation experiments conducted at 295 K. The permeation rates ranged from $7.9 \times 10^{-13}$ to $4.1 \times 10^{-8}$ mol $m^{-2}$ $Pa^{-1}$ $sec^{-1}$ and were independent of pressure from 300 to 7000 kPa. The lack of pressure dependence in the permeance indicates that Poiseuille flow did not take place. The ideal separation factors are one to two orders of magnitude greater than the values that they would have been if they were arising from Knudsen diffusion through the pores.

A synthetic natural gas mixture containing I volume percent (vol. %) nitrogen was continuously separated over one of the membranes at 195 K yielding a permeate with a composition containing over 90 vol. % nitrogen.

Various deposition methods, for depositing polymer on a porous material, are useful herein including ultrasonic coating, spray coating, spin coating, dipping, and painting. Ultrasonic deposition is preferred as use of an ultrasonic "horn" (nozzle) allows for control of the amount of material deposited. This method is described in detail in co-pending, commonly assigned Docket No. CL-1415, PCT/US00/06463, filed on Mar. 10, 2000, which is incorporated herein by reference.

USE OF ULTRASONIC DEPOSITION TO PRODUCE FILM SUPPORTED NANOPOROUS CARBON MEMBRANES

Ultrasonic deposition (UD) provides near zero spray velocities, droplet sizes which are narrowly distributed in size from $10-10^2$ microns, accurate precursor delivery rate and localization. In this work, sintered stainless steel (SS304) tubing (Mott Metallurgical Corp.) with an outside diameter of 6.35 mm, a wall thickness of 1.48 mm, a length of 25 mm and a nominal "macropore size" of 0.2 Mm, was used as the NPC support medium. This porous tube was welded between two, non-porous stainless steel tubes (SS304, length of 38.1 mm). After welding the tube assembly was cleaned for 15 minutes in an ultrasonic bath and dried in an oven for at least 2 hours at 393 K.

The porous metal tube assembly was rotated at 150 revolutions per minute and the ultrasonic nozzle was translated in the axial direction at speeds ranging from 1 to 2 mm/sec and at position 6 mm above the tube center-line. The nozzle was powered by a generator operating at 40 kHz. The polymer solution used for the coating step consisted of 25 to 30 weight percent (wt. %) PFA in acetone, and it was delivered at a volume flow rate of 1 cc/min to the ultrasonic nozzle. After coating the tube, it was rotated for an additional 10 minutes in air to evaporate excess acetone before weighing the coated assembly. Typically, the coating mass varied between 3 and 11 mg depending on the speed at which the nozzle was translated axially.

The coated tube assembly was placed inside a 57 mm diameter quartz tube that was fitted with end caps so that the coated support could be rotated at 30 rpm during the pyrolysis. Initially, the quartz tube was purged with helium (scientific grade) for 15 minutes to ensure that all the air had been removed before firing. The temperature ramp rate was 5.0° C./min., and the final or thermal "soak" temperatures of 423, 650, 723, 800, or 873 K were held between 0 to 120 minutes (Table I). The main difference between the membranes described herein and those described earlier is that previously each coating of polymer was fired at the same temperature and no additives were included. For these samples the polymer concentration in acetone, firing temperatures, thermal soak temperatures, number of coatings, final film mass, calculated thickness, and additives are each provided in Table I.

EXAMPLES

Specifically, SNPCM-5 was coated six times with 25 wt. % PFA in acetone and fired at 873 K between each coating with a final carbon mass of 33.9 mg. SNPCM-27, 28, and 32 were each fired at different soak times of 120, 60, and 0 minutes at 723 K. SNPCM-32 third coating contained only 10 wt. % PFA in acetone. SNPCM-43 the first three coatings of PFA were each fired at 423 K, followed by a firing at 723 K, with a final finish coat applied and fired at 723 K. One weight percent zeolite (SSZ-13) was added to a 30 wt. % PFA in acetone solution and used for coating SNPCM-73 and 74. SSZ-13 has a chabazite (CHA) structure with a pore size of 3.8×3.8 angstroms. These pore size values represent only a crystallographic pore opening and are calculated using the ionic radius of oxygen.

SNPCM-76 and 77, the first coating of PFA was fired at 800 K, followed by a second coating fired at 723 K, and a third coating fired at 650 K; SNPCM-76 was made with 30 wt. % PFA in acetone while SNPCM-77 was made with the zeolite containing solution. Ten weight percent titanium dioxide calcined at 923 K for 1 hour was added to a 30 wt. % PFA in acetone solution and used for the first two coatings on SNPCM-83 while the third and final coating was just the PFA/acetone solution. Twenty five weight percent PEG with a molecular weight of 1500 and 900 were each prepared in 30 wt. % PFA in acetone. The homogeneous solutions were used to coat SNPCM-85 and 86, respectively. A new ultrasonic horn operating at 60 kHz was used for preparing SNPCM-95. SNPCM-96 was pyrolyzed in a hydrogen environment rather than helium. SNCPM-97 like SNPCM-73 and 74 was prepared with a higher concentration of high pore silica zeolite (15 wt. %) in PFA and acetone. Finally SNPCM-511 is one of our first attempts to scale-up the membrane area from our previously described support area to a tubular support with an outside diameter of 12.7 mm and a porous length of 150 mm.

After completion of each heat treatment, the furnace is shut off and the tube assembly was allowed to cool in the oven under flowing helium except for SNPCM-96 which was cooled undered a hydrogen atmosphere. During the entire pyrolysis process the quartz tube was purged with helium at a flow rate of 100 sccm or in the case of SNPCM-96 hydrogen at 100 sccm. This pyrolysis protocol followed that used for synthesis of unsupported NPC (D. S. Lafyatis, J. Tung, H. C. Foley, Poly(furfuryl alcohol)-Derived Carbon Molecular Sieves: Dependence of Adsorptive Properties on Carbonization Temperature, Time and Poly(ethylene glycol) Additives, Inc. Eng. Chem. Res., 30 (1991) 865, and R. K. Mariwala, H. C. Foley, Evaluation of Ultramicroporous Adsorptive Structure in Poly(furfuryl alcohol)-Derived Carbogenic Molecular Sieves, Ind. Eng. Chem. Res., 33 (1994) 607). The tubular membranes were weighed after each pyrolysis and typically the mass of NPC added to the support was in the range from 3 to 11 mg with a carbon yield of 20 to 40%, depending upon the initial coating mass, the pyrolysis temperature and the time. Taking the density of the NPC to be 1.6 g/cm$^3$, the final total carbon mass for SNPCM-5 was 33.9 mg with a calculated membrane thickness of 20.9 $\mu$m (Table I)

The gas permeances were obtained by inserting the SNPCM's into a membrane module, which consisted of a cylindrical tube fitted with knife-edge flanges, which was sealed on both ends with copper gaskets. Pressure rise experiments were performed as described previously. The relationship given in eqn. 1 was used to describe the unsteady state experiments and to calculate the pure gas permeances:

$$\frac{V_{ss}}{A \cdot R \cdot T} \nabla \ln \frac{|P_{cs} - P_{ss0}|}{|PCS - P_{ss}|} = \frac{\pi'}{\delta} \nabla t \qquad (1)$$

where $V_{ss}$ (m$^3$) is the shell side volume, A (m$^2$) is the membrane area, R (m$^3$ Pa gmol$^{-1}$ K$^{-1}$) is the gas constant, T (K) is the temperature, $P_{cs}$ and $P_{ss}$ (Pa) are the pressures on the core side and shell side of the tubular membrane, respectively, P' is the gas permeability (mol m$^{-1}$ sec$^{-1}$ Pa$^{-1}$), D(m) is the membrane thickness, and t (sec) is time. Recalling that the core side pressure is constant, a plot of the left-hand-side of equation (1) versus time, gives a straight line with a slope of $\pi'/\delta = P_0$, which is the gas permeance (mol m$^{-2}$ sec$^{-1}$ Pa$^{-1}$).

By feeding a mixture of gases continuously to the SNPCM core at a pressure of 3550 kPa and a flow rate of 10 sccm, a steady state separation was obtained. A 10 sccm helium purge was used as a sweep gas on the shell side of the membrane and exit gas samples were analyzed using a gas chromatograph in the usual way.

Permeances for nitrogen (N$_2$), oxygen, (O$_2$), helium (He), and hydrogen (H$_2$) and ideal separation factors, the ratios of permeances, are provided in Table II. The permeances for each of the gases ranged from 7.9×10$^{-13}$ to 4.1×10$^{-8}$ mol m$^{-2}$ sec$^{-1}$ Pa$^{-1}$. There are several significant findings in this work. The permeance ratios provide a concise means for comparison to Knudsen "ideal selectivities" given in terms of the square root of the molecular weights of the two gases under consideration. The permeance ratios make clear that the transport process is not Knudsen in nature.

SNPCM-5 which was synthesized at 873 K achieved high fluxes with low selectivity; however, still greater than Knudsen. Similar to preparing bulk nanoporous carbon, higher temperature pyrolysis increases porosity.

SNPCM-27, 28, and 32 achieved O$_2$/N$_2$ selectivities of 6 to 8 with fluxes 10 to 20 times higher than as previously reported. The higher flux of these membranes compared with SNPCM-11 which was synthesized at the same temperature, 723 K, is related to decreased membrane thickness. These three membranes were also tested with nitrous oxide and we found that we can easily separate the larger N$_2$O molecule from the smaller N$_2$ molecule at about 20 times above the Knudsen limit.

Despite the simpler and less energy intensive pyrolysis route to SNPCM-43, the flows through the membrane are consistent with those that have been reported previously, SPCM-2,3. Although the ideal selectivities for these gases in this membrane are not as high as the highest we have measured, they are still higher than the corresponding Knudsen values. There is no indication of any pressure dependence in the permeances of these gases over a wide range and hence there is no evidence of Poiseuille or bulk flow. This indicates that there are essentially no cracks or pinholes in the layer. From this we can be sure that the layering technique is accomplishing the goal of repairing imperfections even though we have changed the intermediate stages of the pyrolysis. The lower oxygen to nitrogen ratio of 5 versus 30 for SNPCM-43 compared to SNPCM-11 (see Table II) is likely due to the very high degree of sensitivity that this ratio displays with very small changes in final NPC mass and thickness. In FIG. 1 we compare the ideal oxygen to nitrogen separation ratio for several membranes as a function of carbon mass normalized by membrane surface area. (We consider this ratio to be among the most stringent indicators of molecular sieving behavior in the carbon.) Interestingly, it has been found that membranes with the highest selectivities are centered around a carbon to surface area value between 3.4 and 3.6 mg/cm$^2$. This supports the idea, previously discussed, that there is a critical thickness for these membranes and narrows the value for this thickness to a range centered at 22+/-1 Mm based on a solid density of 1.6 mg/cm$^3$. The maximum in the selectivity with thickness may be explained because below this critical deposition amount defects may still be present in the coating providing Poiseuille flow paths and reducing the ideal selectivities. While at a carbon film thickness greater than the critical thickness the film begins to crack and again create Poiseuille flow paths which reduce the separation factors. Of course other factors that are much more subtle, and more fundamental, such as cross-linking, skeletal density, and pore size, must also be involved and may be convoluted within the apparent thickness. Using the values of permeances that we have measured and the thickness of the membranes that we have computed, the behavior of these membranes (indicated by symbols) can be placed on the well known Robeson plot of oxygen to nitrogen ideal selectivity as a function of gas permeance (FIG. 2). Based on these results we see that the new materials we have prepared hold the promise of providing as good or better performance than some polymer membrane systems, at least for those reported prior to 1991 (indicated by line). Furthermore the relationship between selectivity and permeability displayed by these new materials is similar to that of their polymeric relatives in that there is a tradeoff between selectivity and flux. Yet, at the same time we see that by preparing composites of NPC with inorganic oxides and small pore high silica zeolites, membranes that break away from the standard linear behavior may be produced.

The addition of zeolite (SSZ-13) or titanium dioxide to the polymer precursor in synthesizing the coatings for SNPCM-73, 74, 77, and SNPCM-83, respectively, also increased the gas fluxes with excellent ideal gas selectivities. These mixed matrix films may provide opportunities for achieving narrow range pore size distributions more tightly centered around the pore size of interest for a given gas separation.

SNPCM-76 achieved a high O$_2$/N$_2$ selectivity comparable to SNPCM-11 with twice the O$_2$ permeance. We believe that the initial coatings at higher temperatures may have produced a more porous bridge between the final CMS layer and macroporous metal support resulting in improved gas fluxes.

SNPCM-85 and 86 were prepared by adding PEG polymer to the PFA and acetone solution. The PEG decomposes during pyrolysis to increase porosity in the NPC carbon film which is evident by the three orders of magnitude increase in the $N_2$ and $O_2$ permeances. More work is needed to determine the optimum molecular weight PEG.

SNPCM-95, 96, 97, and 511 were coated with an ultrasonic horn operating at a higher frequency, 60 kHz. SNPCM-96 was pyrolyzed in a hydrogen furnace. Compared with other carbon films synthesized at the same temperature, 723 K, SNPCM-96 shows permeances that are two orders of magnitude larger.

Scale-up is necessary to increase the surface area and produce modules for pilot scale separation studies. SNPCM-511 has a surface area 12 times larger than the other tubes listed in Table I. Flux and selectivities shown in Table II and FIGS. 1 and 2 indicate that these thin carbon films can be scaled up while still maintaining the unique separation properties of these materials.

The eighteen membranes described herein demonstrate that continuous nanoporous carbon films can be fabricated into membranes with high small molecule gas separation selectivities possible. Even for the purely carbon materials we observe that the oxygen permeance and ideal oxygen to nitrogen selectivity can be varied over a wide range by controlling the carbon film thickness, and synthesis temperature. Using new methods of preparation in some cases we trade off the ideal oxygen-nitrogen selectivity in return for a less energy intensive and shorter pyrolysis protocol. We wondered if a membrane with an apparently low ideal selectivity might prove to be a useful molecular sieve for some other separation. A good example is membrane SNPCM-43 which displayed an ideal oxygen-nitrogen selectivity of just five. The low ideal selectivity between these two molecules did not translate into equally low ideal selectivities for hydrogen, carbon dioxide ($CO_2$), and methane ($CH_4$); in fact these ($H_2/CO_2$, $H_2/CH_4$ and $CO_2/CH_4$) were each one to two orders of magnitude above the corresponding Knudsen values, Table III. In addition this membrane was capable of separating $O_2$ from $CO_2$ which is not possible with most polymer membranes. Ideal selectivity of 3.3 was achieved compared with the Knudsen limit of 1.17.

A steady state gas separation experiment was run with a synthetic natural gas mixture containing: 1% $N_2$, 1.2 vol. % $CO_2$, 2.5 vol. % ethane ($C_2H_6$), 0.5 vol. % propane ($C_3H_8$) and 94.8 vol. % $CH_4$. At room temperature the permeate contained 10 times more $N_2$ and 8 times more $CO_2$ than the feed. As the temperature was decreased to 195 K, the permeate contained over 90 vol. % $N_2$, Table IV. Although the absolute rate of mass transfer or flow through the membrane was still low ($N_2$ permeance $1.5 \times 10^{-11}$ mol/m$^-$2.sec$^{-1}$.Pa$^{-1}$), the data demonstrate that SNPCM-43 made by this method did behave as a useful molecular sieve.

TABLE I

Synthesis Conditions and Carbon Coating Results

| SNCPM | PFA (wt. %) | Temp. (K.) | Time (min) | Coats | Mass (mg) | Thickness (Mm) | Additives |
|---|---|---|---|---|---|---|---|
| 5 | 25 | 873 | 120 | 6 | 33.9 | 20.9 | |
| 11 | 25 | 723 | 120 | 3 | 17.3 | 10.7 | |
| 17 | 25 | 573 | 120 | 3 | 18.6 | 11.4 | |
| 27 | 25 | 723 | 60 | 4 | 11.9 | 7.3 | |
| 28 | 25 | 723 | 0 | 5 | 15.0 | 9.3 | |
| 32 | 25,10 | 723 | 120 | 3 | 14.8 | 9.1 | |
| 43 | 25 | 423,723 | 60,120 | 4 | 7.7 | 4.7 | |
| 73 | 30 | 723 | 120 | 4 | 23.9 | 14.7 | 1 wt. % SSZ-13 |
| 74 | 30 | 723 | 120 | 3 | 14.5 | 8.9 | 1 wt. % SSZ-13 |
| 76 | 30 | 800,723,650 | 120 | 3 | 20.8 | 12.8 | |
| 77 | 30 | 800,723,650 | 120 | 3 | 18.4 | 11.4 | 1 wt. % SSZ-13 |
| 83 | 30 | 723 | 120 | 3 | 17.2 | 10.6 | 10 wt. % $TiO_2$ |
| 85 | 30 | 723 | 120 | 2 | 10.2 | 6.3 | 25 wt. % PEG 1500 |
| 86 | 30 | 723,673 | 120 | 2 | 9.8 | 6.0 | 25 wt. % PEG 900 |
| 95 | 30 | 723 | 120 | 4 | 22.2 | 13.7 | |
| 96 | 30 | 723 | 120 | 6 | 29.4 | 18.1 | |
| 97 | 30 | 723 | 120 | 3 | 25.6 | 15.8 | 15 wt. % SSZ-13 |
| 511 | 30 | 673,723 | 120,60 | 5 | 349.0 | 18.2 | |

TABLE II

Pure Component Gas Permeances and Separation Factors

| | Permeance (mol m$^{-2}$ Pa$^{-1}$ sec$^{-1}$ × 10$^{-10}$) | | | | | Separation Factor | | | |
|---|---|---|---|---|---|---|---|---|---|
| SNPCM | $N_2$ | $O_2$ | He | $H_2$ | $N_2O$ | $O_2/N_2$ | $He/N_2$ | $H_2/N_2$ | $N_2O/N_2$ |
| 5 | 65.0 | 136 | 213 | 409 | | 2.1 | 3.3 | 6.3 | |
| 11 | 0.0183 | 0.557 | 3.26 | 6.05 | | 30.4 | 178 | 331 | |
| 17 | 0.0079 | 0.106 | 1.25 | 1.38 | | 13.5 | 160 | 175 | |
| 27 | 0.372 | 2.33 | 6.28 | 13.0 | 5.23 | 6.3 | 16.9 | 35.1 | 14.1 |
| 28 | 0.143 | 0.984 | 3.22 | 8.14 | 2.48 | 6.9 | 22.4 | 56.8 | 17.3 |
| 32 | 0.254 | 2.04 | 6.82 | 14.0 | 3.43 | 8.0 | 26.9 | 55.0 | 13.5 |
| 43 | 1.24 | 6.20 | 9.02 | 25.6 | | 5.0 | 7.3 | 20.6 | |

TABLE II-continued

Pure Component Gas Permeances and Separation Factors

| | Permeance (mol m$^{-2}$ Pa$^{-1}$ sec$^{-1}$ × 10$^{-10}$) | | | | | Separation Factor | | | |
|---|---|---|---|---|---|---|---|---|---|
| SNPCM | N$_2$ | O$_2$ | He | H$_2$ | N$_2$O | O$_2$/N$_2$ | He/N$_2$ | H$_2$/N$_2$ | N$_2$O/N$_2$ |
| 73 | 0.486 | 3.52 | 5.76 | 15.6 | | 7.2 | 11.9 | 32.1 | |
| 74 | 0.320 | 2.87 | | | | 9.0 | | | |
| 76 | 0.038 | 1.08 | 2.75 | 7.21 | | 28.3 | 72.3 | 189 | |
| 77 | 0.043 | 0.433 | | | | 10.2 | | | |
| 83 | 0.050 | 1.02 | 2.96 | 7.95 | | 20.4 | 59.4 | 159 | |
| 85 | 17.6 | 77.7 | | | | 4.4 | | | |
| 86 | 34.6 | 117 | | 332 | | 3.4 | | 9.6 | |
| 95 | 0.280 | 2.78 | 5.83 | 17.5 | | 9.9 | 20.8 | 62.4 | |
| 96 | 22.5 | 92.1 | | | | 4.1 | | | |
| 97 | 0.28 | 1.75 | 4.37 | 13.3 | | 6.3 | 15.6 | 47.6 | |
| 511 | 2.21 | 11.1 | | | | 5.0 | | | |
| SPCM2,3,4 | 2.11 | 6.27 | | | | 3.0 | | | |
| Knudsen | | | | | | 0.94 | 2.65 | 3.73 | 0.80 |

TABLE III

Pure Component Gas Permeances and Separation Factors for SNPCM-43

| | Permeance (mol.m$^{-2}$.Pa$^{-1}$.sec$^{-1}$ × 10$^{-10}$) | | | | | | Separation Factor | | | | |
|---|---|---|---|---|---|---|---|---|---|---|---|
| | N$_2$ | O$_2$ | He | H$_2$ | CO$_2$ | CH$_4$ | H$_2$/CH$_4$ | H$_2$/CO$_2$ | CO$_2$/CH$_4$ | O$_2$/N$_2$ | O$_2$/CO$_2$ |
| SNPCM-43 | 1.24 | 6.20 | 9.02 | 25.6 | 1.87 | 0.0415 | 618 | 13.7 | 45.1 | 5.0 | 3.3 |
| Knudsen | | | | | | | 2.83 | 4.69 | 0.60 | 0.94 | 1.17 |

TABLE IV

Synthetic Natural Gas Mixture
Steady-State Separation Results for SNPCM-43

| Sample | Temperature (K.) | N$_2$ (vol. %) | CO$_2$ | C$_2$H$_6$ | C$_3$H$_8$ | CH$_4$ |
|---|---|---|---|---|---|---|
| Feed | 298 | 1.0 | 1.2 | 2.5 | 0.5 | 94.8 |
| Permeate | 298 | 9.8 | 9.9 | 2.4 | 0.5 | 77.4 |
| Permeate | 195 | 90.8 | 4.9 | 0 | 0 | 4.3 |

What is claimed is:

1. A process for making a supported thin film nanoporous carbon membrane, having additive intermixed therein, comprising:
   (a) coating a porous substrate with one or more layers of polymer intermixed with additive or a polymer alone, wherein at least one of the layers consists of polymer intermixed with additive, wherein the polymer or polymer intermixed with additive mixture is optionally dissolved in a solvent;
   (b) drying the polymer coating by evaporating any solvent that may be present;
   (c) then pyrolyzing the polymer or polymer mixture on the porous substrate so as to form a thin mixed matrix carbon film with pores for separation of small molecules; and, optionally,
   (d) repeating steps (a), (b) and (c) one or more times;
   wherein the polymer is selected from the group consisting of poly(furfuryl) alcohol, poly(vinyl chloride) and poly(acrylonitrile) and wherein the additive is selected from the group consisting of titanium dioxide, small pore high silica zeolites, and poly(ethylene glycol).

2. A nanoporous carbon membrane supported on a porous substrate produced by the process of claim 1.

3. The process of claim 1 wherein the polymer or polymer with additive, to be coated on the substrate is dissolved in a solvent.

4. The process of claim 3 wherein the solvent is selected from the group consisting of acetone, methylethylketone, benzene and toluene.

5. The process of claim 1 wherein the support is selected from the group consisting of porous metals, porous ceramics, porous glasses and porous composites.

* * * * *